United States Patent
Joels et al.

(10) Patent No.: US 10,070,282 B2
(45) Date of Patent: Sep. 4, 2018

(54) SYSTEM AND METHOD FOR HANDLING UNDESIRED COMMUNICATION AT A MOBILE DEVICE

(71) Applicant: Verizon Patent and Licensing Inc., Arlington, VA (US)

(72) Inventors: Jo Ann Joels, Tulsa, OK (US); Gina M. Ganley, Millstone Township, NJ (US); Paul V. Hubner, McKinney, TX (US); Robert A. Clavenna, Lucas, TX (US); Abby Charfauros, San Diego, CA (US); Patrick J. Moran, Shrewsbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/339,225

(22) Filed: Jul. 23, 2014

(65) Prior Publication Data

US 2016/0029188 A1    Jan. 28, 2016

(51) Int. Cl.
| | | |
|---|---|---|
| H04W 4/14 | (2009.01) | |
| H04M 3/436 | (2006.01) | |
| H04M 3/00 | (2006.01) | |
| H04M 3/523 | (2006.01) | |
| H04W 4/16 | (2009.01) | |
| H04M 3/42 | (2006.01) | |

(52) U.S. Cl.
CPC ......... *H04W 4/16* (2013.01); *H04M 3/42136* (2013.01); *H04M 3/436* (2013.01)

(58) Field of Classification Search
CPC ........ H04M 3/436; H04M 1/663; H04M 1/57; H04L 63/101; H04W 4/16
See application file for complete search history.

(56) References Cited

U.S. PATENT DOCUMENTS

| | | | | |
|---|---|---|---|---|
| 2010/0322402 A1* | 12/2010 | Ramanathan | ..... | H04M 3/42059 379/211.01 |
| 2013/0039483 A1* | 2/2013 | Wolfeld | ..... | H04M 3/00 379/265.03 |
| 2014/0044246 A1* | 2/2014 | Klemm | ..... | H04M 3/523 379/93.01 |
| 2014/0331278 A1* | 11/2014 | Tkachev | ..... | H04L 63/08 726/1 |
| 2016/0019402 A1* | 1/2016 | Khandelwal | ..... | G06F 21/6254 726/26 |

\* cited by examiner

*Primary Examiner* — Frantz Bataille

(57) ABSTRACT

An approach for handling undesired communication at a mobile device is disclosed. A call scoring platform detects a request for delivery of a communication from an originator to a recipient. The call scoring platform then collects data feeds from data sources associated with the communication, the originator, the recipient, or a combination thereof and based on the data feeds, a score is computed for the communication, the originator, or a combination thereof. Further, based on the computed score filtering and/or blocking of delivery of the communication to the recipient is initiated. In addition, the call scoring platform creates a personal scoring system for one or more users wherein the users may assign scores for an incoming communication.

20 Claims, 12 Drawing Sheets

US 10,070,282 B2

SYSTEM AND METHOD FOR HANDLING UNDESIRED COMMUNICATION AT A MOBILE DEVICE

BACKGROUND INFORMATION

Telecommunication service providers and device manufacturers (e.g., wireless, cellular, etc.) are continually challenged to deliver value and convenience to consumers by, for example, providing compelling telecom subscriber services. One area of interest has been the development of services that enable users to handle nuisance or undesired communication such as, telephone calls and/or messages received at mobile devices. Some of the nuisance communication may include a telemarket communication, an advertisement communication, promotional communication, crank calls, wrong numbers, calls from acquaintances, etc. In particular, users do not desire to indulge into such communication if they are received too frequently or if they occur at inappropriate time such as, when the users are engaged in other activities (e.g., meeting, sleeping, etc.).

Further, different users have different opinions about these calls, for example, for a particular user, a telemarketing call may be a nuisance call, but on the other hand, such calls may be useful for other users. Generally, in order to block these calls, various telecom service providers provide subscriber services such as, Do-Not-Disturb (DND) service to their users. However, the users have to pay a certain amount of fees to the service providers to activate these services and sometimes important calls may be automatically rejected after activating the DND service. Further, conventional techniques for call blocking may also enable users to manually block each of undesired phone numbers. However, individually blocking calls from each of the undesired phone numbers is a time-consuming process. Further, it is very cumbersome for the users to unblock previously blocked phone numbers. Moreover, users are hesitant to receive calls from unknown sources, since these types of calls are majorly promotional calls descending from the user's interest. Further, users tend to receive nuisance calls from unknown callers since no prior information associated with these callers is known to the user.

Based on the foregoing, there is a need for providing a mobile application to handle undesired communication at user mobile devices.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and system for providing a mobile application to filter and/or block undesired communication at a mobile device of a user, is described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although the various exemplary embodiments are described with respect to a mobile device, it is contemplated that these embodiments have applicability to other architectures.

Figure 1:
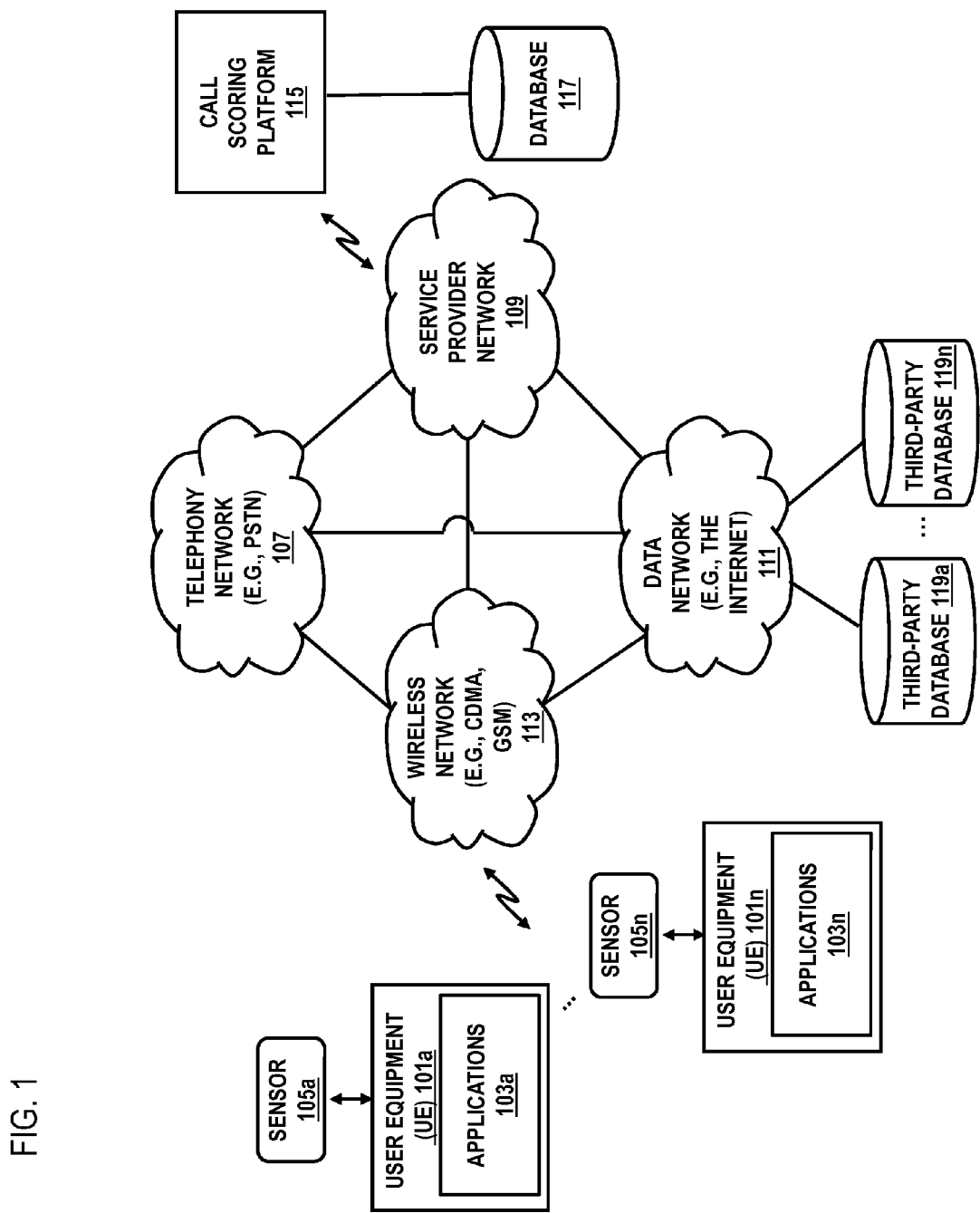
FIG. 1 is a diagram of a system capable of handling undesired communication at a mobile device, according to one embodiment.

FIG. 1 is a diagram of a system 100 capable of handling undesired communication at a mobile device. In one scenario, the handling of the undesired communication, may include, but is not restricted to, filtering of undesired communication, blocking of undesired calls, or a combination thereof. In one embodiment, a type of the communication may include, but is not restricted to, a voice call, a voice message, a Short Message Services (SMSs), a Multimedia Messaging Services (MMSs), an Instant Message (IM), a Voice over Internet Protocol (VoIP) call, an email, and so forth. For the purpose of illustration, the system 100 employs, in certain embodiments, user equipment 101*a*-101*n*, hereinafter referred to as mobile device 101. In one embodiment, the mobile device 101 may include, but are not restricted to cellular phones, smart phones, and the like. The mobile device 101 may further include applications 103*a*-103*n*, hereinafter referred to as an application 103. In one implementation, all incoming communication to the mobile device 101 may be received by the application 103. The application 103 is configured to filter and/or block incoming nuisance or undesired communication to the mobile device 101. In one embodiment, the application 103 may be considered as a Graphical User Interface (GUI) of the mobile device 101 that provides options to recipients of an incoming communication to answer/receive a communication, reject the communication, edit caller information and/or originator list, assign a score to the communication, a score threshold to the communication, block an incoming communication from an originator, or a combination thereof. In one embodiment, a user may rate a call by assigning a score, for example, a user may assign a score of 9/10 for a call from his mother. By assigning a score to a call a user allocates value to a call. On the other hand, a score threshold may represent the level at which an action occurs for a call, for example, a user may set a threshold for calls by setting a rule to let any calls rated 9/10 and higher through at any time. In such manner, the user is blocking calls with an assigned score less than 9/10. In one scenario, when a user receives a call, he/she may take action based on the threshold, either manually or automatically. Further, the application 103 may enable users of the mobile device 101 to define the score (e.g., 2, 3, 5, etc.) to the incoming communication. In one scenario, the score may determine usefulness and/or relevancy of the communication to the recipient. Also, the application 103 enables recipients to manually provide the score to a list of originators and/or callers stored in the mobile device 101. For example, the recipient may provide the score to each of the originators in a contact list of the mobile device 101. In another embodiment, the application 103 may also enable recipients to define the score to communication received from unknown callers. Based on the score threshold, the application 103 determines handling of communication from the originators. In one implementation, the score and/or score thresholds defined by the recipients to the communication received from the originators are stored in a database 117. In certain embodiments, the application 103 may also be referred to as a caller scoring application 103. In another embodiment, if a recipient accepts the communication, an aggregated score, hereinafter referred to as a score is automatically updated (an increase in value of the score) in a database 117 associated with the application 103 for that particular communication and/or originator of the communication, or a combination thereof. In another embodiment, the score of the message is automatically updated (decrease in value of a score) in a database 117 if the recipient rejects the communication.

In another embodiment, the application 103 may also enable recipients to assign the score to originators (stored in the mobile device 101). This score is used to filter and/or block communication delivery from the originators. For example, recipients may block and/or unblock an originator for a certain period of time (e.g., a week, a month, etc.). Furthermore, the application 103 may enable recipients to override the score associated with the originators. In one embodiment, the recipient may manually change the score for the originator by using the application 103.

Further, the mobile device 101 may use sensors 105a-105n, hereinafter referred to as a sensor 105, to communicate with a call scoring platform 115 through various wireless networks 107-113. By way of example, the sensors 105 may be any type of sensor. In certain embodiments, the sensors 105 may include, for example a network detection sensor for detecting wireless signals or receivers for different short-range communications (e.g., Bluetooth, Wi-Fi, Li-Fi, near field communication etc.). For illustrative purposes, the networks 107-113 may be any suitable wireless networks, and are managed by service providers. For example, a telephony network 107 may include, but is not restricted to, a circuit-switched network, such as the Public Switched Telephone Network (PSTN), an Integrated Services Digital Network (ISDN), a Private Branch Exchange (PBX), or other like networks. Although depicted as separate entities, the networks 107-113 may be completely or partially contained within one another, or may embody of the aforementioned infrastructures. For instance, a service provider network 109 may embody circuit-switched and/or packet-switched networks that may include facilities to provide for transport of circuit-switched and/or packet-based communications. It is further contemplated that the networks 107-113 may include components and facilities to provide signaling and/or bearer communications between the various components or facilities of the system 100. In this manner, the networks 107-113 may embody or include portions of a signaling system 7 (SS7) network, or other suitable infrastructure to support control and signaling functions. In addition, the system 100 may operate as separate parts that rendezvous and synchronize periodically to form a larger system with similar characteristics.

Further, data network 111 may be any Local Area Network (LAN), Metropolitan Area Network (MAN), Wide Area Network (WAN), the Internet, or any other suitable packet-switched network, such as a commercially owned, proprietary packet-switched network, such as a proprietary cable or fiber-optic network. Further, wireless network 113 may employ various technologies including, for example, Code Division Multiple Access (CDMA), Enhanced Data Rates For Global Evolution (EDGE), General Packet Radio Service (GPRS), Mobile Ad Hoc Network (MANET), Global System For Mobile Communications (GSM), 4G Long-Term Evolution (LTE), Internet Protocol Multimedia Subsystem (IMS), Universal Mobile Telecommunications System (UMTS), etc., as well as any other suitable wireless medium, e.g., microwave access (WiMAX), Wireless Fidelity (WiFi), satellites, and the like.

Further, the call scoring platform 115 may filter and/or block delivery of the undesired communication at the mobile device 101. In one embodiment, the application 103 may communicate with the call scoring platform 115 to retrieve information that aid in filtering and/or blocking the delivery of the undesired communication on the mobile device 101. The information may include, but is not restricted to, an originator's name, an originator's phone number, a communication type (e.g., a voice call, a SMS, a MMS, an email, etc.), a communication content, and the like. The information may be stored in the database 117, in an embodiment. Further, the database 117 may store profile of users and/or subscribers that have downloaded the application 103 on their mobile device 101. The profile of the users may include, but is not restricted to, a name, a phone number, an alternate phone number, an email address, a status of the user (block/unblock), a score of communication, etc. In one embodiment, the score of a communication is a score that is computed by the call scoring platform 115 based on score defined by other recipients of the communication by using the application 103. In one embodiment, the database 117 may also store the data feeds associated with the communication, the originator, the recipient, or a combination thereof. Further, the call scoring platform 115 may generate the score of the communication based on source of the communication which is also stored in the database 117. In an embodiment, the score may be generated based on a communication source, for example, a phone number, an email address, and the like.

In another embodiment, the call scoring platform 115 receives the score from the recipient of the communication, the originator, or a combination thereof, and then computes a score for the communication, the originator, or a combination thereof. This score is stored in the database 117 and is provided to the users of the application 103 as additional information associated with communication originators. In one scenario, the recipient of the communication may provide the score to an originator of the communication by accepting and/or rejecting the communication. In another embodiment, the recipient may provide the score to the communication, the originator, or a combination thereof by selecting an update score button (not shown) in the application 103.

Further, the call scoring platform 115 may collect data feeds associated with the communication, the originator, the recipient, or a combination thereof. In one embodiment, the data feeds may include, but are not restricted to, contextual information, trust level information, nuisance caller information, organization information, or a combination thereof.

Further, the call scoring platform 115 may calculate an individual score, a score, or a combination thereof for recipients of the communication from an originator. In another embodiment, the call scoring platform 115 may collect data feeds, a score, or a combination thereof from the recipients in order to update the score of the originator, the recipient, the communication, or a combination thereof in the database 117. Further, the database 117 may also store an algorithm to compute scores of the originators. The call scoring platform 115 is further explained in FIG. 2.

In one embodiment, the application 103 may further present a notification to the recipient about an incoming communication request and its associated score. The notification may include, but is not restricted to, a first option to receive the communication (e.g., a message), a second option to update the score, a third option to process the communication according to a preset rule, a fourth option to categorize the communication and/or the originator of the communication, or a combination thereof. In one implementation, the preset rule may specify criteria for the delivery of the communication to the mobile device 101. The criteria are based on, but are not restricted to, a relevancy of the communication, a relevancy of the originator, a popularity level of the communication, a popularity level of the originator, or a combination thereof. In another embodiment, a call scoring platform 115 may assign scores and/or score thresholds to one or more calls based, at least in part, on call categories, call numbers, reputation of the scorer, or a combination thereof. In one example embodiment, a call scoring platform 115 may receive a call for delivery to a recipient. Then, the call scoring platform 115 may process the call to determine its category. Subsequently, the call scoring platform 115 may forward the call to the recipient upon determination that the call falls under the category approved by the user.

Further, third party database 119*a*-119*n*, hereinafter referred to as a third party database 119, may store information associated with the originators. In one embodiment, the third party database 119 may store information associated with commercial callers such as, telemarketing callers, advertising agencies, contact centers, and the like.

Figure 2:
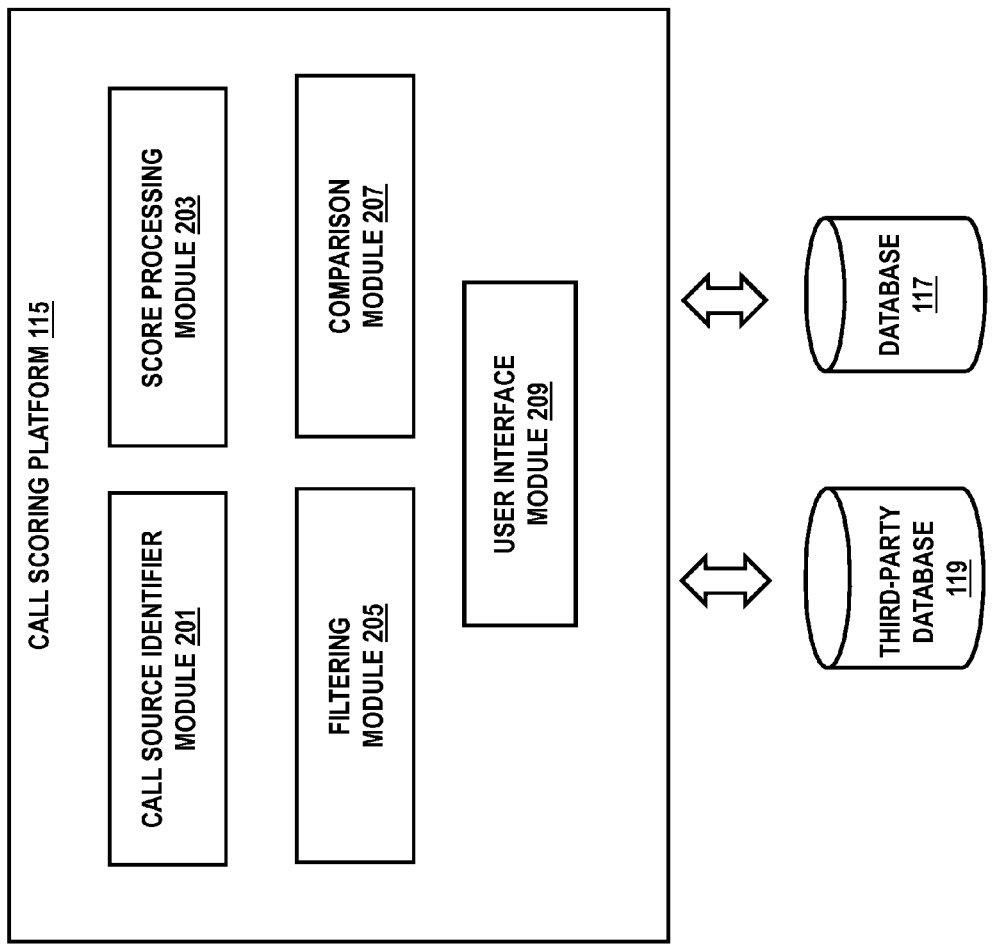
FIG. 2 is a diagram of components of a call scoring platform for handling undesired communication at the mobile device, according to one embodiment.

FIG. 2 is a diagram of components of the call scoring platform 115 for handling (filtering and/or blocking) delivery of undesired communication at the mobile device 101, according to one embodiment. The call scoring platform 115 may include a call source identifier module 201, a score processing module 203, a filtering module 205, a comparison module 207, and a user interface module 209.

The call source identifier module 201 may determine a request for delivery of a communication from an originator to a recipient. In one embodiment, the communication may include, but is not restricted to, a voice call, a voice message, a Short Message Service (SMS), a Multimedia Messaging Service (MMS), an instant message (IM), an email, a Voice over Internet Protocol (VoIP), and the like. Further, the call source identifier module 201 may identify details of the originator of the communication. The details of the originator may include, but are not restricted to, a name, a phone number, a score provided by other recipients, the score provided by the recipient to the originator, or combination thereof. In one embodiment, the originator may be an unknown person, an organization, a contact center, a telemarketer, a family member, and the like.

The call source identifier module 201 may further identify data feeds associated with the communication, the originator, and the recipient. The data feeds may include, but are not restricted to, contextual information, trust level information, nuisance originator information, organization information, or a combination thereof. In one embodiment, the identified data feeds may be received from multiple sources such associated with recipients, phone numbers, email addresses, and the like. Further, the call source identifier module 201 may also identify an individual score, a score, or a combination thereof, for the recipient, the originator, the communication, or a combination thereof. In one embodiment, the call source identifier module 201 may collect an individual score of the originator, which may be previously provided by the recipient of the communication to the originator, the communication, or a combination thereof. If the originator is an unknown person then a score of the person provided by other recipients is retrieved by the call source identifier module 201, in another embodiment. In yet another embodiment, the call source identifier module 201 may identify a status of the originator and/or communication. The status may include, but is not restricted to, blocked, unblocked, blocked for a particular duration (blocked for 2 hours, blocked for a week, unblock after 5 hours), and the like.

Further, the call source identifier module 201 may identify preset rules associated with the communication. In one implementation, the preset rules may specify criteria for the delivery of the communication to the recipient. The criteria are based on, but are not restricted to, a relevancy of the communication, a relevancy of the originator, a popularity level of the communication, a popularity level of the originator, or a combination thereof. For example, a recipient may define a preset rule such as "block all calls starting with number +XYZ". In one embodiment, the call source identifier module 201 may cause a parsing of an incoming call based on preset rules, wherein preset rules include reputation of a scoring group or a person, for example, a user may trust ABC call scoring group. Then, the call scoring platform 115 may forward an incoming call to a recipient based on the score given by ABC call scoring group.

The score processing module 203 may enable the recipient to assign the score to the communication, the originator, or a combination thereof. In one embodiment, the recipient may define the score threshold and/or a rating to the communication, the originator, or a combination thereof. In one embodiment, the score may be assigned to a plurality of originators or communication thereof, such as numerical ratings (e.g., 10, 44, 75, 4/5, 8/10, etc.), star ratings (e.g., 2 star, 4 star, etc.), and the like. For example, the recipient of the communication may assign a score between a range of 1-100 to the communication received from the originator. In another embodiment, the recipient may assign the score to a phone number from which the communication has originated. Further, the score processing module 203 may enable the recipient to override the score of the communication, the originator, or a combination thereof. In one embodiment, the recipient may manually update the score of the communication, the originator, or a combination thereof by using the application 103. In another embodiment, the score of the communication, the originator, or a combination thereof may be updated based on the recipient's action (e.g., accepting and/or rejecting the message). Further, based on the recipient's action, the score threshold and a score of the communication, the originator, or a combination thereof may be updated.

The score processing module 203 may collect the identified data feeds associated with the communication, the originator, and the recipient from multiple sources. In one embodiment, the sources may include, but is not restricted to, a user, a phone number, a database (such as database 117), a third party database (such as third party database 119), and the like. Further, the score processing module 203 may calculate an individual score of the communication, the originator, or a combination thereof for the recipient and other recipients of the message. In another embodiment, the score processing module 203 may calculate a collective score of the communication, the originator, or a combination thereof for the recipient and other recipients of the communication. In one embodiment, the score processing module 203 may calculate the individual score and/or a score based on the collected data feeds and/or score associated with the communication, the originator, and the recipient. Further, the score processing module 203 may calculate and update the individual scores and/or the scores of the communication, the originators, the recipients, or a combination thereof in the database 117 in a real-time environment.

The filtering module 205 may filter and/or block delivery of undesired communication to the mobile device 101 based on individual scores stored in the database 117. In one embodiment, the individual score is provided by the recipient of the communication. For example, if an individual score provided by a recipient to an advertisement message is 3 then the advertisement message is filtered and/or blocked by the filtering module 205. Further, the filtering module 205 may filter and/or block communications based on the scores of the communication stored in the database 117. In one embodiment, the score may be calculated by the score processing module 203 based on the individual scores provided by the recipients of the communication. For example, if the score of the communication is 5/10 then the communication is filtered and/or blocked by the filtering module 205. On the other hand, if the score of the communication is 10/10 provided by other recipients then the communication is delivered to the recipient.

Further, the filtering module 205 may filter and/or block communication based on the status of the originator of the communication. The status of the originator may include, but is not restricted to, blocked, unblocked, blocked for 2 hours, blocked for a week, unblock after 5 hours, and the like. In one embodiment, the status of the originator may be provided by the recipient of the communication. For example, if the recipient is in a meeting, then the recipient may block a call from a friend for an hour. Further, the filtering module 205 may filter and/or block delivery of undesired communication based on the preset rules. In one embodiment, the preset rule may specify, but is not limited to, a relevancy of the communication, a relevancy of the originator, a popularity level of the communication, a popularity level of the originator, or a combination thereof. Further, the filtering module 205 may categorize the communication and/or originator of the communication based on the preset rules.

The comparison module 207 may compare the score of the communication with the score threshold, in one embodiment. In one embodiment, the comparison module 207 may compare the score provided by the recipient with the score computed by the score processing module 203. For example, if the score of the communication is 3/5 and the score provided by the user is 2/5, then the score of the communication is compared and is then filtered and/or blocked.

The user interface module 209 may generate notifications to the recipients. In one embodiment, the notifications may indicate a request for the delivery of the communication and the scores (e.g., score, individual score, etc.) of the communication to the recipient. In one embodiment, the notification may include, but is not restricted to, a first option to receive the communication, a second option to update the score, a third option to process the communication according to a preset rule, a fourth option to categorize the communication or the originator of the communication, or a combination thereof. Further, the user interface module 209 may present the generated notifications to the recipient of the communication. In one embodiment, the notifications may be displayed to the user at the time of communication delivery. For example, the notification may be displayed when an incoming voice call or message is delivered to the mobile device 101.

Further, the user interface module 209 may display notifications to change the status of the originator. In one embodiment, if the status of the originator is "block the originator for 2 hours", then after 2 hours, a notification and/or an alert is displayed having options to, but is not limited to, unblock the originator, block for another 2 hours, and the like. In one implementation, the notifications may be in the form of, but is not limited to, beeps, vibrate, pop-ups, and the like.

Figure 3:
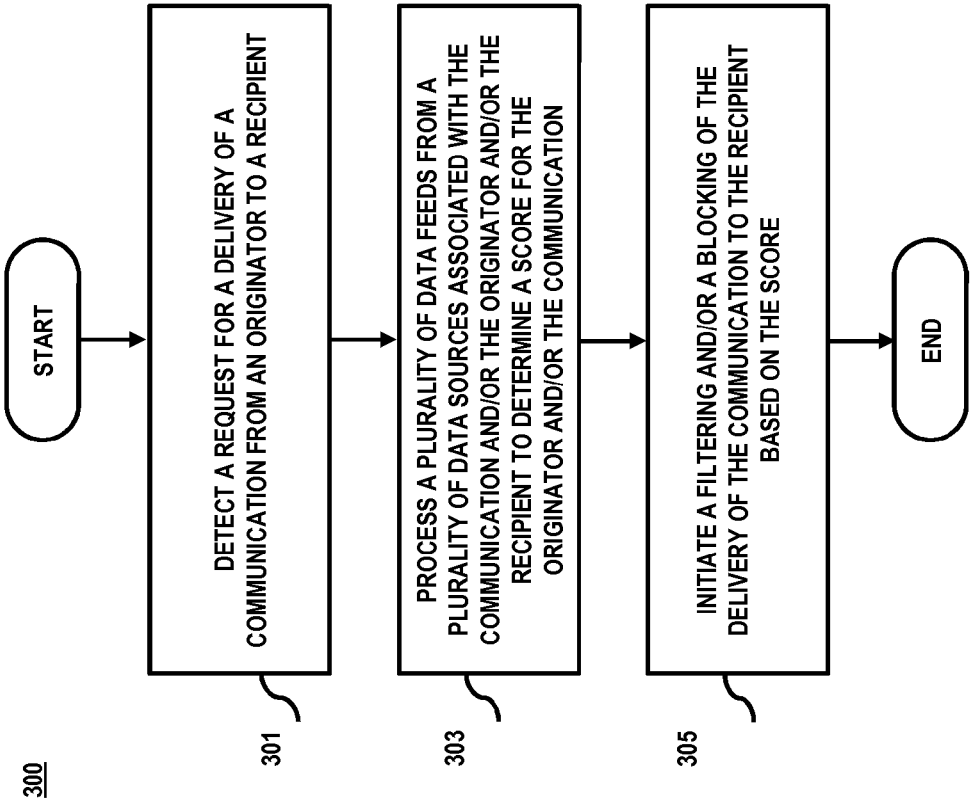
FIGS. 3 and 4 are flowcharts of a process for handling of undesired communication at the mobile device, according to one embodiment.

FIG. 3 is a flowchart for initiating filtering of undesired communication delivery on the mobile device 101, according to an embodiment. The flowchart of FIG. 3 discloses a specific embodiment of the invention where the type of communication can be in the form of a message. However, the type of communication may also include, but is not restricted to, a voice call, a voice message, a Short Message Services (SMSs), a Multimedia Messaging Services (MMSs), an instant message (IM), a Voice over Internet Protocol (VoIP) call, an email, and so forth. At step 301, a call scoring platform 115 detects a request for a delivery of a message from an originator to a recipient. In one embodiment, the messages may include, but is not restricted to, a voice call, a voice message, a Short Message Service (SMS), a Multimedia Messaging Service (MMS), and so forth. The originator of the message may be, but is not limited to, a friend, a family member, a contact center, an organization, a telemarketer, and the like.

At step 303, the call scoring platform 115 processes data feeds from data sources associated with the communication, and/or the originator, and/or the recipients of the communication. In one embodiment, the data feeds may include, but is not restricted to, contextual information, trust level information, nuisance originator information, organization information, or a combination thereof. In one implementation, the data feeds may be received from data sources of the messages such as, recipients, phone numbers, email addresses, and the like. In an embodiment, the call scoring platform 115 may analyze the data feeds to determine a score for the message and/or originator of the message.

Thereafter, at step 305, the call scoring platform 115 initiates a filtering and/or blocking of the delivery of the communication to the recipient based on the score. In one scenario, if the score of the message is high, for example, 10/10, then the message is delivered to the recipient. On the other hand, if the score of the message is low, for example, 3/10, then the delivery of the message to the recipient is blocked. In one embodiment, the score for the message is computed by the call scoring platform 115 based on the data feeds and individual scores assigned and/or provided by other recipients of the message. Further, the computed score of the message, and/or the information associated with the originator of the message, may be stored in the database 117.

Figure 4:
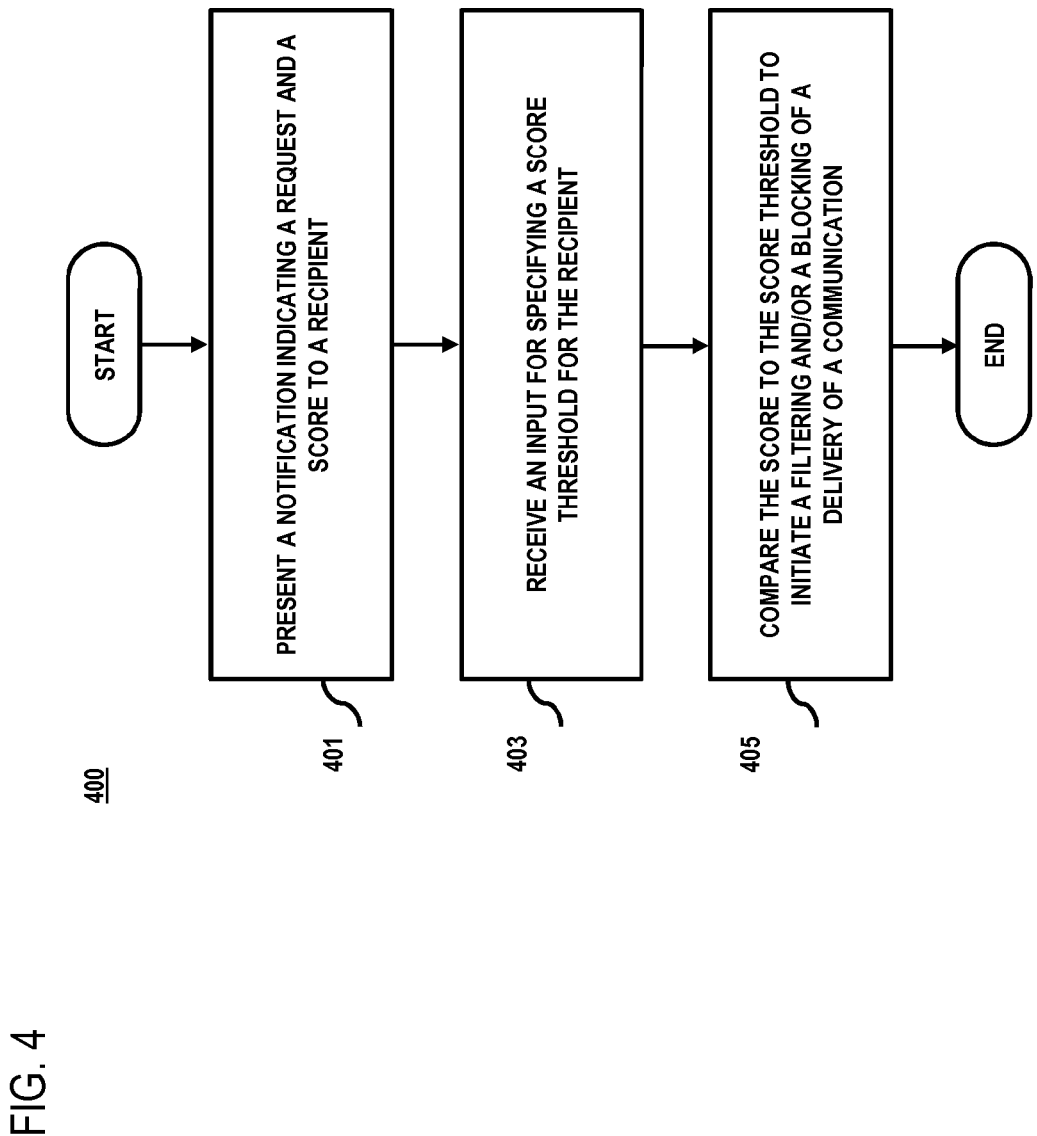

FIG. 4 is a flowchart for initiating filtering and/or blocking of delivery of undesired communication to the mobile device 101, according to another embodiment. The flowchart of FIG. 4 discloses a specific embodiment of the invention where the type of communication may be in the form of a message. However, the type of communication may also include, but is not restricted to, a voice call, a voice message, a Short Message Services (SMSs), a Multimedia Messaging Services (MMSs), an instant message (IM), a Voice over Internet Protocol (VoIP) call, and so forth. At step 401, a call scoring platform 115 presents a notification on the mobile device 101. The notification may indicate a delivery request of a message, a score associated with the message, or a combination thereof. In one embodiment, the score may be a score that is computed by the call scoring platform 115 based on individual scores assigned by other recipients of the message. The notification may include, but is not restricted to, a first option to receive the message, a second option to update the score associated with the message, a third option to process the message according to a preset rule, a fourth option to categorize the message or the originator of the message, or a combination thereof. In one implementation, the preset rule may specify criteria for the delivery of the message. The criteria are based on, but are not restricted to, a relevancy of the message, a relevancy of the originator, a popularity level of the message, a popularity level of the originator, or a combination thereof.

At step 403, the call scoring platform 115 receives an input from the recipient to specify a score of the message for the recipient. In one embodiment, the recipient of the message may assign the score to the message based on a relevancy of the message to the recipient. For example, the recipient may define a score 2 to a message, if the message is an advertisement of a machine tool, and the recipient may define a score 9 to a message, if the message is an advertisement of apparels. Further, the specified score threshold to the message helps the call scoring platform 115 to determine handling of the received messages.

Further, the call scoring platform 115 enables the recipient to override the score of the message, the originator, or a combination thereof. In one embodiment, the recipient may manually update the score of the message, the originator, or a combination thereof by using the application 103. In another embodiment, the score of the message, the originator, or a combination thereof may be overridden based on the recipient's action (e.g., accepting and/or rejecting the message). In another embodiment, based on the recipient's action, the score of the message, the originator, or a combination thereof may be updated.

Next, at step 405, the call scoring platform 115 compares the score to the score threshold to initiate filtering and/or blocking of the delivery of the communication to the recipient. In one embodiment, if the score of the message is less than the score threshold then the delivery of the message is blocked, and the message is not received by the recipient. In another embodiment, if the score of the message is more than the score threshold assigned by the recipient, then the message is filtered and is delivered to the mobile device 101 of the recipient.

In yet another embodiment, based on the computed score, the call scoring platform 115 may automatically filter and/or block the message based on preset rules defined by the recipient. For example, a recipient may define a preset rule such as "block all calls starting from 123 and 456". Further, based on the computed score, the score of the message is also updated in the database 117, in one implementation.

Figure 5:
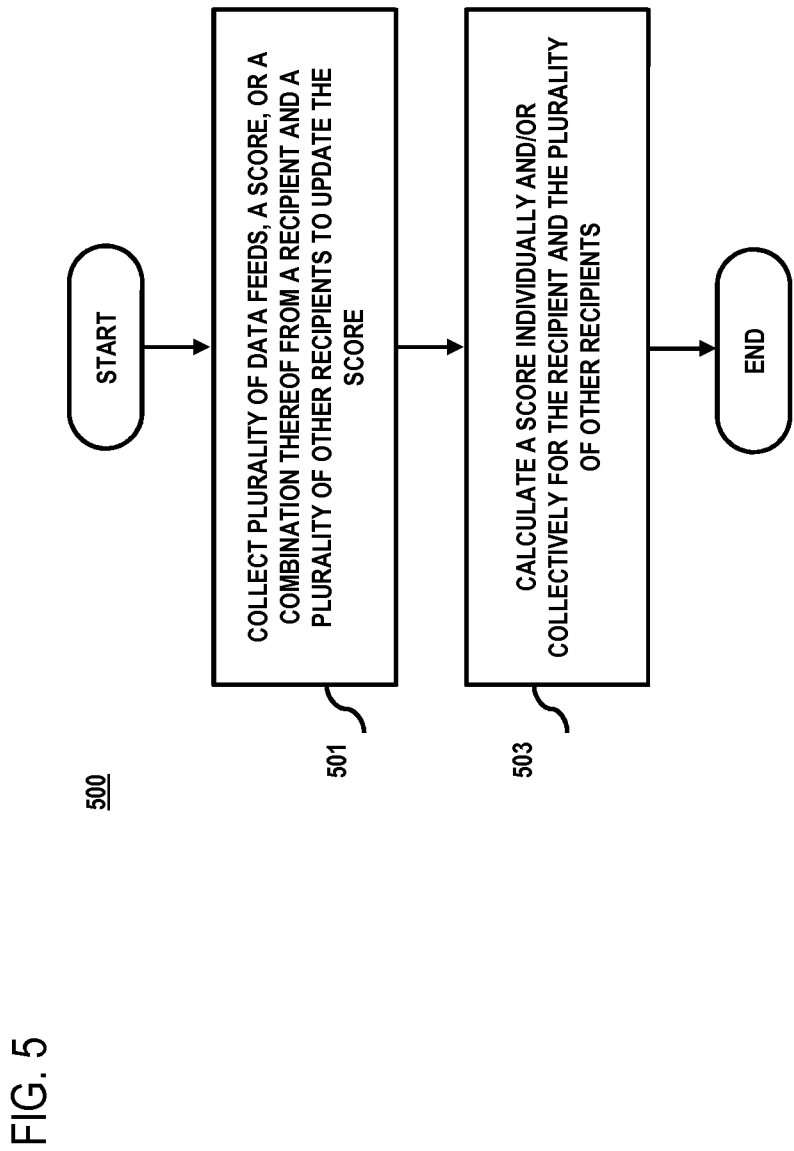
FIG. 5 is a flowchart of a process for calculating scores for recipients of undesired communication, according to one embodiment.

FIG. 5 is a flowchart for calculating message scores for recipients, according to an embodiment. Although, the flowchart of FIG. 5 is explained with message type communication, the communication may also include, but is not restricted to, a voice call, a voice message, a Short Message Services (SMSs), a Multimedia Messaging Services (MMSs), an instant message (IM), a Voice over Internet Protocol (VoIP) call, an email, and so forth. At step 501, a call scoring platform 115 collects data feeds from the recipient of the message and other recipients of the message. The data feeds may include, but is not restricted to, contextual information, trust level information, nuisance originator information, organization information, or a combination thereof. In one embodiment, the identified data feeds may be collected from multiple sources such associated with recipients, phone numbers, email addresses, and the like.

Further, the call scoring platform 115 collects a score associated with the message from the recipient and/or recipients of the message. In one embodiment, the score may be an individual score of the message that is assigned and/or defined by the recipient of the message. The individual score for the message may be defined by the recipient of the message based on a relevancy of the message, status of the originator, relation (e.g., friend, family member, acquaintance, etc.) of the originator with the recipient, or a combination thereof. The call scoring platform 115 may collect the data feed, score, or a combination thereof to update a score of the message for the recipients in the database 117.

At step 503, the call scoring platform 115 calculates an individual score of the message for the recipients, in one embodiment. The call scoring platform 115 may calculate an individual score for each of the recipients based on the collected data feeds and score from the recipients. For example, if the score of the message is 7, and an individual score 5 is assigned to the message by the recipient, then the score of the message is revised based on the assigned score and further individual score for recipients may also be calculated and modified.

Figure 6:
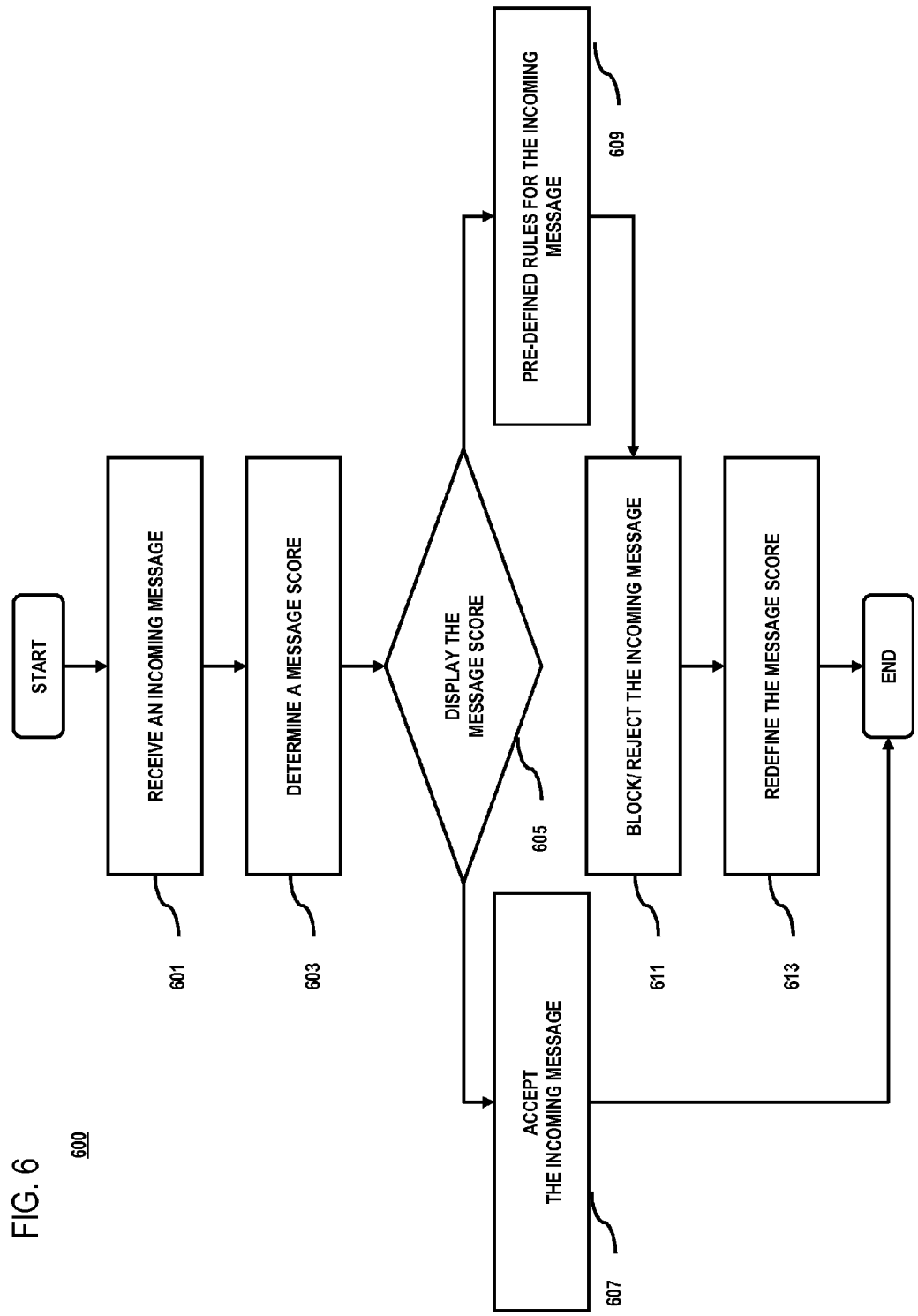
FIG. 6 is a flowchart of a process for handling an undesired message and redefining a score of the message, according to one embodiment.

FIG. 6 is a flowchart for filtering an undesired communication and redefining a score of the communication, according to an embodiment. The flowchart of FIG. 6 is explained with message type communication, the communication may be any type of communication such as, but is not restricted to, a voice call, a voice message, a Short Message Services (SMSs), a Multimedia Messaging Services (MMSs), an instant message (IM), a Voice over Internet Protocol (VoIP) call, and so forth. At step 601, a caller scoring application 103 receives an incoming message on a mobile device 101, in one embodiment. The message may include, but is not restricted to, a voice call, a voice message, a Short Message Service (SMS), a Multimedia Messaging Service (MMS), an email, a Voice over Internet Protocol (VoIP), and the like. An originator of the message may be, but is not limited to, a friend, a family member, a telemarketer, an organization, a contact center, and the like.

At step 603, the caller scoring application 103 determines a message score for the incoming message. In one embodiment, the message score may be a score of the incoming message. The score for the message may be computed by a call scoring platform 115 based on data feeds, individual scores defined by other recipients, or a combination thereof. In one implementation, the data feeds may include, but is not restricted to, contextual information, trust level information, nuisance originator information, organization information, or a combination thereof. In one embodiment, the identified data feeds may be collected from multiple sources such associated with recipients, phone numbers, email addresses, and the like. Further, the caller scoring application 103 may retrieve the message score from the database 117 that is associated with the call scoring platform 115.

At step 605, the caller scoring application 103 displays the message score on the mobile device 101. In one embodiment, the caller scoring application 103 may present a notification for the message score associated with the incoming message on the mobile device 101. The notification may include, but is not restricted to, a first option to receive and/or accept the incoming message, a second option to update the score, a third option to process the incoming message according to a preset rule, a fourth option to categorize the incoming message or the originator of the incoming message, or a combination thereof. In one implementation, the preset rule may specify criteria for the delivery of the message. The criteria are based on, but are not restricted to, a relevancy of the incoming message, a relevancy of the originator, a popularity level of the incoming message, a popularity level of the originator, or a combination thereof.

Further, the caller scoring application 103 displays additional information to the recipient of the incoming message. The additional information may include, but is not limited to, a name of the originator, a status of the originator, a phone number, an email address, and the like. In one implementation, the status of the message and/or originator may include, but is not restricted to, blocked, unblocked, blocked for 2 hours, blocked for a week, unblock after 5 hours, and the like.

At step 607, the caller scoring application 103 determines that the incoming message is accepted by the recipient and the process concludes.

At step 609, the caller scoring application 103 determines that the incoming message is to be handled based on preset rules (as discussed above) defined by the recipient, in one embodiment. For example, the recipient defined a preset rule that "reject all calls from acquaintances for 30 minutes" then the incoming message is handled based on the preset rule defined by the recipient.

Thereafter, at step 611, the caller scoring application 103 blocks and/or rejects all the incoming messages based on the preset rule defined by the recipient. For example, the recipient may define preset rule as all the incoming messages from the acquaintances are automatically rejected for next two hours. Next, at step 613, the caller scoring application 103 redefines or updates the score of the incoming message based on the recipient's action. The recipient's action may include, but is not limited to, accepting and/or receiving the incoming message, rejecting the incoming message, ignoring the incoming message, and the like. Further, the caller scoring application 103 transmits the redefined message score to the call scoring platform 115 for storing the redefined score in the database 117.

Figure 7:
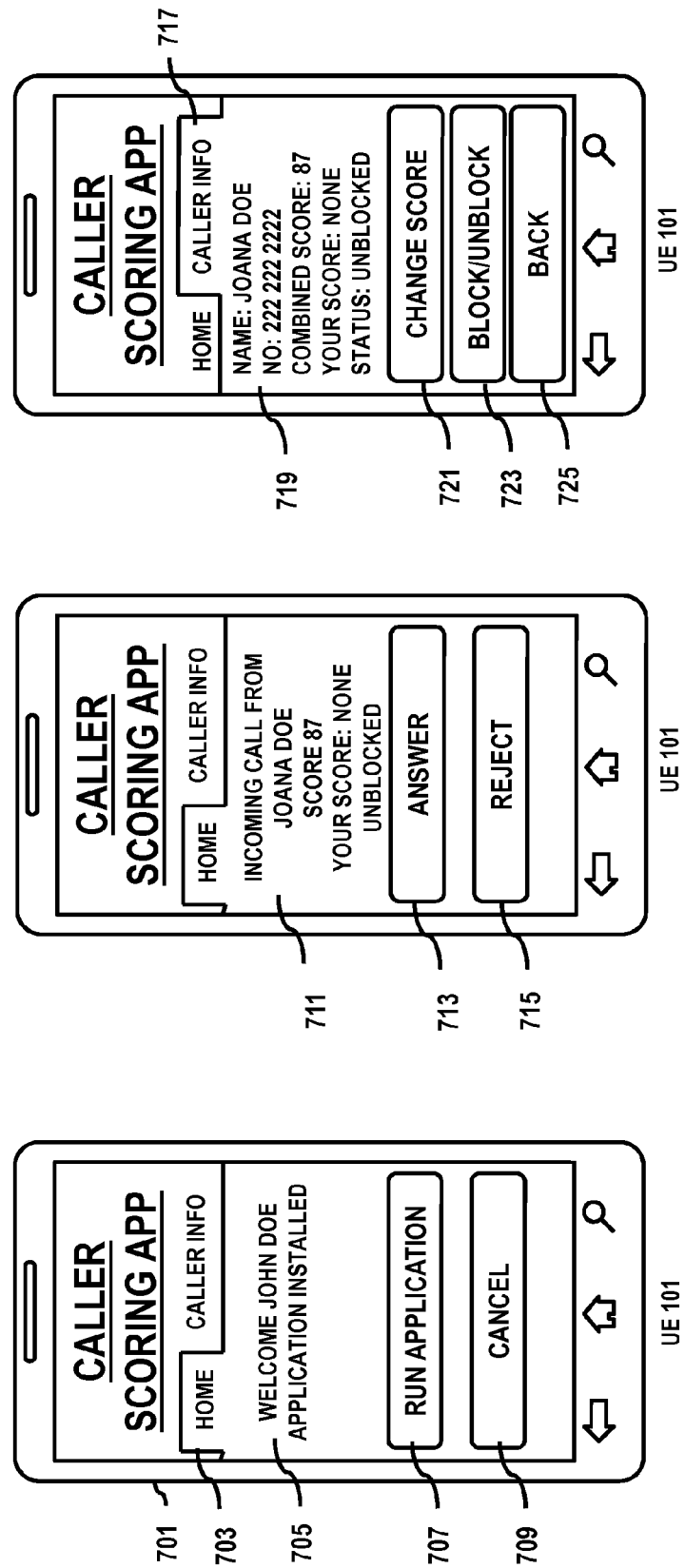
FIGS. 7 and 8A-8C are diagrams of a Graphical User Interface (GUI) of an application for handling undesired communication on the mobile device, according to one embodiment.

FIG. 7 is a diagram of a Graphical User Interface (GUI) of the caller scoring application 103 running on a mobile device 101, according to one embodiment. On a mobile device 701, the caller scoring application 103 is running. A home tab 703 of the caller scoring application 103 displays a home screen that displays a welcome message 705 and another message indicating that the caller scoring application 103 is installed on the mobile device 701. In one embodiment, the mobile device 701 may be a mobile device 101 as disclosed in FIG. 1. Further, a run application button 707 is displayed on the mobile device 701. When the user clicks on the run application button 707, the caller scoring application starts operating in the mobile device 701. In an embodiment, the caller scoring application 103 operates in background of the mobile device 701 and uses minimal resources and power of the mobile device 701. Further, if the user desires to cancel the operation of the caller scoring application 103 in the mobile device 701, the user may then click on a cancel button 709.

When an incoming message, for example, a voice call is detected then additional information about the message and its originator is displayed in the home screen on the mobile device 701. As shown in the FIG. 7, an incoming call from "Joana Doe" is detected and additional information 711 such as, name ("Joana Doe") of the originator of the voice call, score of the voice call and/or "Joana Doe", individual score assigned by the recipient to "Joana Doe", a status of "Joana Doe", or a combination thereof, is displayed on the mobile device 701. Further, an answer button 713 is displayed on the mobile device 701 that enables the recipient of the voice call from "Joana Doe" to accept and/or receive the voice call. Also, the recipient of the voice call may reject and/or ignore the incoming voice call by clicking on a reject button 715 displayed on the caller scoring application 103.

Further, when the recipient of the incoming message clicks on caller info tab 717 then information 719 associated with the incoming call is displayed to the recipient by the caller scoring application 103. The information 719 may include, but is not restricted to, a name of the originator, a phone number of the originator, a score stored in the database 117 associated with the call scoring platform 115, an individual score that is previously defined by the recipient to the originator and/or call, a status of the originator, and a combination thereof. In one embodiment, the status of the originator may include, but is not restricted to, blocked, unblocked, blocked for 2 hours, blocked for a week, unblock after 5 hours, and the like. The recipient of the incoming message may change the individual score of the call and/or originator by clicking on a change score button 721. Also, the recipient of the incoming call may change the status of the originator (e.g., blocked to unblock or unblocked to block, etc.) by clicking on a block/unblock button 723. The recipient may further navigate to a previous screen or the home screen by clicking on a back button 725.

Figure 8A:
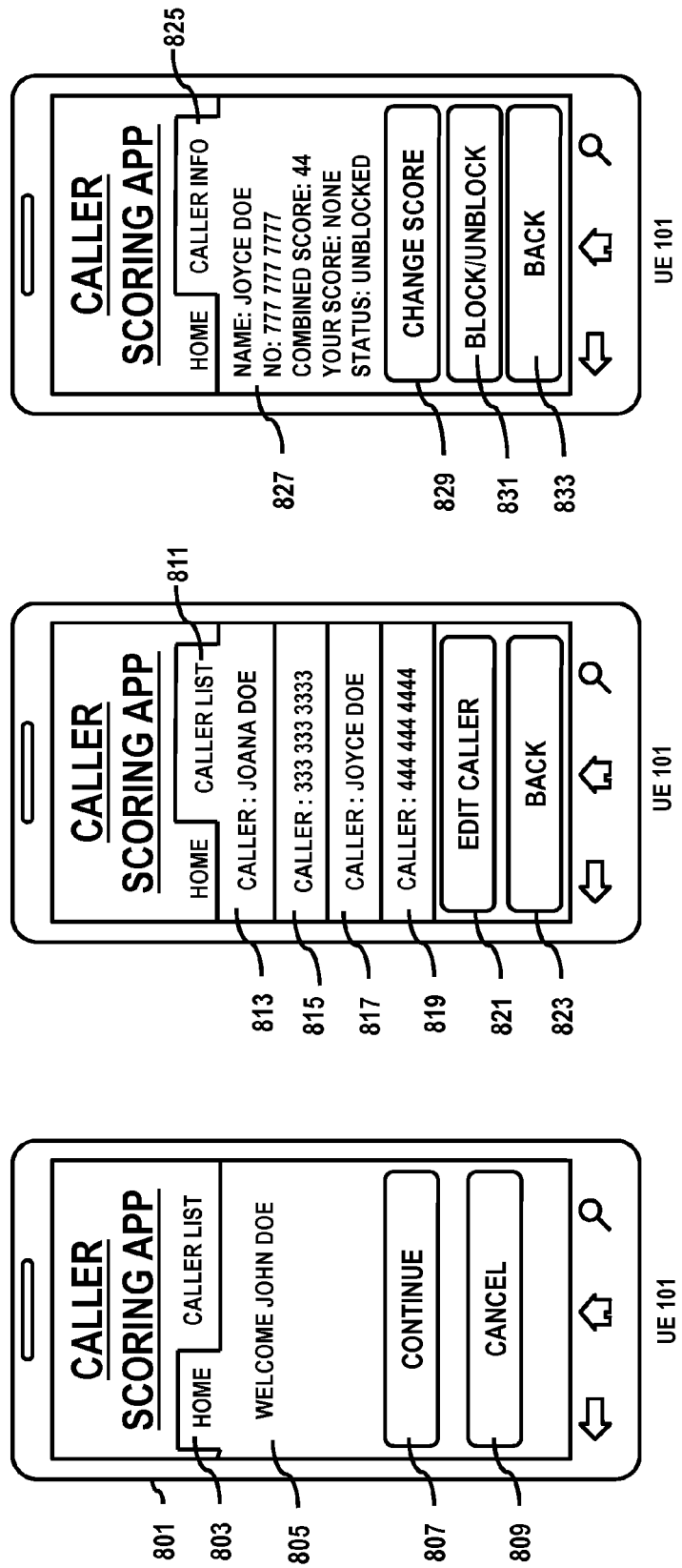
Figure 8B:
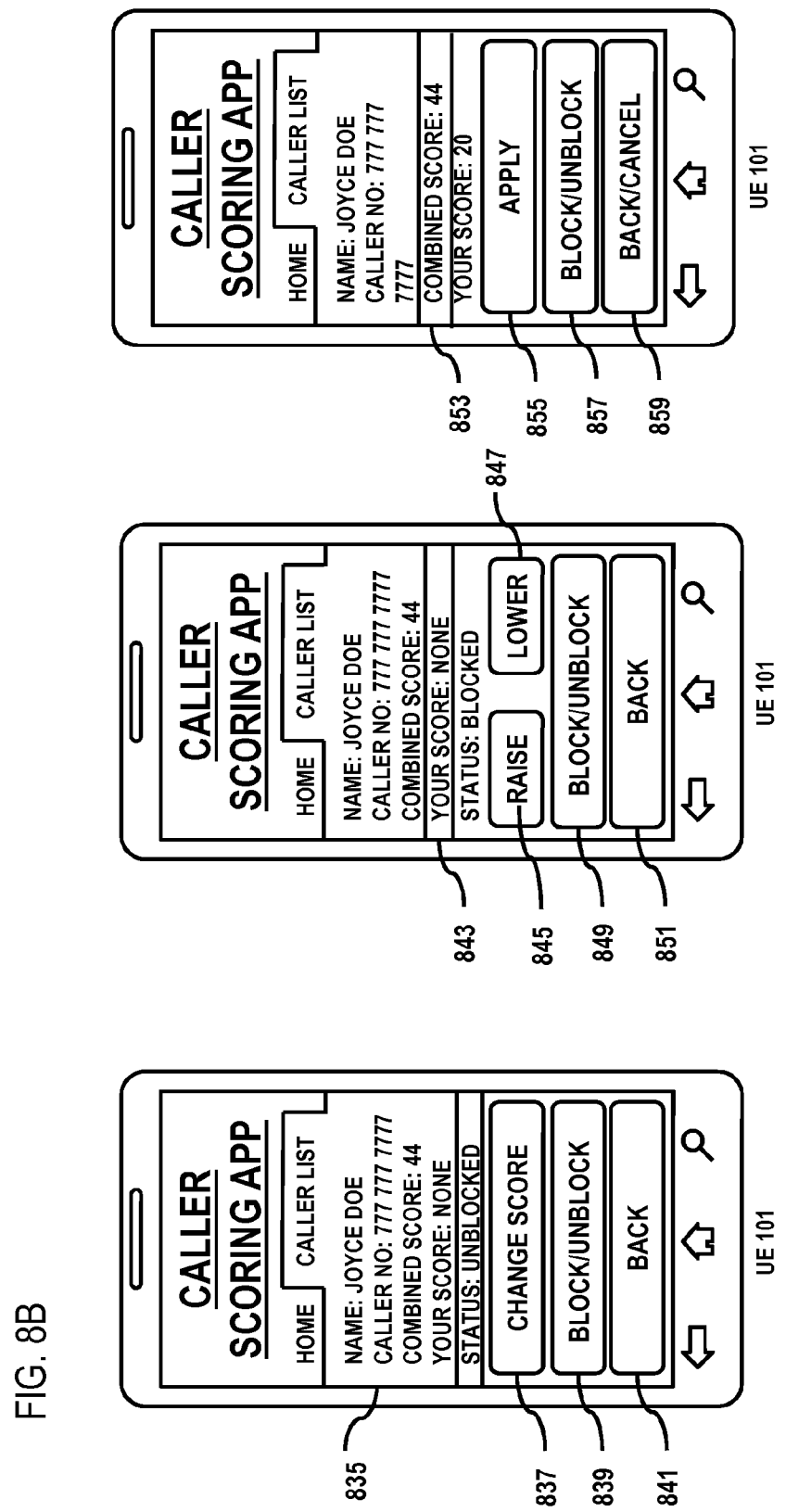
Figure 8C:
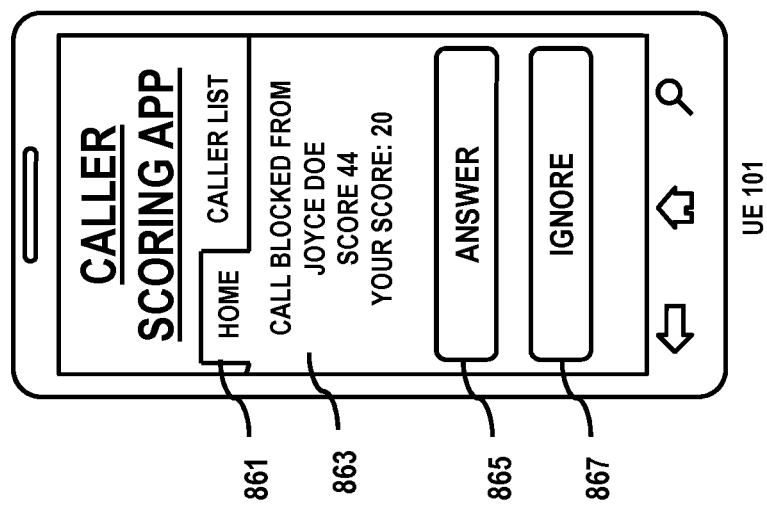

FIGS. 8A-8C are diagrams of a Graphical User Interface (GUI) of the caller scoring application 103 running on a mobile device 801, according to another embodiment. In FIG. 8A, when a user operates a caller scoring application 103 on a mobile device 801, a home tab 803 is displayed. The home screen of the caller scoring application 103 displays a welcome message 805 to the user. The user may then continue operating the caller scoring application 103 by clicking on a continue button 807. Also, the user may close and/or cancel the caller scoring application 103 by clicking on a cancel button 809.

Further, a caller list tab 811 displays a list of callers to the user of the mobile device 801. The list of callers may include, but is not limited to, a list of contacts stored in the mobile device 801, a list of calls received from unknown callers, a list of calls received from family members, and/or friends, and the like. As shown in the FIG. 8A, a caller "Joana Doe" 813 and a caller "Joyce Doe" 817 are displayed and the caller's information is already stored in the mobile device 801. Also, a list of unknown callers (e.g., their phone numbers) is displayed such as, a caller having phone number "3333333333" 815 and another caller having phone number "4444444444" 819. Further, the user may edit details of these callers by clicking on an edit caller button 821 or the user may navigate back to the home screen by clicking on a back button 823.

Further, when the user selects a caller from the list and then clicks on the edit caller button 821, the user is then navigated to a caller info tab 825 and caller information 827 is displayed on the mobile device 801. The caller information 827 may include, but is not restricted to, a name of the caller, a phone number of the caller, a score of the caller stored in the database 117 associated with the call scoring platform 115, an individual score that is previously defined by the user to the caller and/or message, a status of the caller, and a combination thereof. In one scenario, the caller may be an originator of a message. In one embodiment, the status of the originator may include, but is not restricted to, blocked, unblocked, blocked for 2 hours, blocked for a week, unblock after 5 hours, and the like. The user of the mobile device 801 may change the individual score of the caller by clicking on a change score button 829. Also, the user of the mobile device 801 may change the status of the originator (e.g., blocked to unblock or unblocked to block, etc.) by clicking on a block/unblock button 831. In one embodiment, the user may change the status and/or other information of blocked callers stored in the database 117 having a list of the blocked callers. The user may further navigate back to a screen that displays the list of the callers by clicking on a back button 833.

The user may edit the caller information 835 displayed on the mobile device 801, as shown in FIG. 8B. The user of the mobile device 801 may update the individual score of the caller by clicking on a change score button 837. Also, the user of the mobile device 801 may change the status of the caller (e.g., blocked to unblock or unblocked to block, etc.) by clicking on a block/unblock button 839. The user may further navigate back to a screen that displays the list of the callers by clicking on a back button 841. As shown in the FIG. 8B, the user selects the status of the caller and then changed its status from unblocked to blocked by clicking on the block/unblock button 839.

In another embodiment, the user of the mobile device 801 may define an individual score or may update the individual score previously assigned by the user to the originator. In one embodiment, the user may update the individual score of the message and/or the caller previously blocked by the caller scoring application 103 based on preset rules (e.g., block calls from friend for 2 hours). In an embodiment, the preset rules may be defined by the users of the mobile device 801. The user selects the individual score information 843 of the caller and updates the individual score of the caller. The user may increase the individual score of the caller by clicking on a raise button 845 or may decrease the individual score of the caller by clicking on a lower button 847. For example, the user defines a score 20 to message received from the caller "Joyce Doe". The score contributes to a combined score for all users, and may set a local value that takes priority over the combined score. In this manner a user's personal preference takes priority over the scores of the masses. Further, the user may change the status of the caller (e.g., from blocked to unblock or unblocked to block, etc.) by clicking on a block/unblock button 849. The user may navigate back to a screen that displays the change score button 837 by clicking on a back button 851.

Next, the caller information also displays a combined score 853 of the caller. In one embodiment, the combined score 853 is computed by the call scoring platform 115 based on data feeds and individual scores of the caller received from the recipient and/or other recipients. When the information is edited by the user, then the user may save the changes by clicking on an apply button 855. Further, the user may change the status of the caller (e.g., from blocked to unblock or unblocked to block, etc.) by clicking on a block/unblock button 857. The user may further navigate back to a screen that displays the raise and/or lower buttons 845 and/or 847 or may cancel the changes by clicking on a back/cancel button 859.

FIG. 8C presents a home tab 861 that display incoming call information 863 to the recipient of the incoming call. In one embodiment, the incoming call information 863 may include, but is not restricted to, a name of an originator, a status of the call, a score of the call and/or originator, an individual score of the call and/or originator assigned by the recipient, and the like. In one scenario, a call that is blocked by the call scoring platform 115 based on preset rules is received on the mobile device 801. The caller scoring application 103 may then display information 863 associated with the blocked incoming call on the mobile device 801. For example, a recipient of the incoming call blocks all calls and/or messages from a telemarketer for 5 hours, and after 7 hours another call is received from the telemarketer then the caller scoring application 103 delivers the call to the mobile device 801 and displays the blocked call information to the recipient after a set time-period (e.g., 6 hours) from the blocked caller list stored in the database 117 to update information of the telemarketer in the database 117. The recipient of the blocked call may then change settings for the blocked call. Further, the caller scoring application 103 may also present options to the recipient to receive or reject the incoming call by clicking on an answer button 865 or an ignore button 867.

In one embodiment, the caller scoring application 103 may present notifications to the recipients of the blocked incoming communication about change in information for the blocked communication. For example, if a phone number of a blocked caller is changed and an incoming call from the blocked caller using the changed phone number is detected, then the caller scoring application 103 may present a notification about the change in phone number to the recipient of the incoming call.

Figure 9:
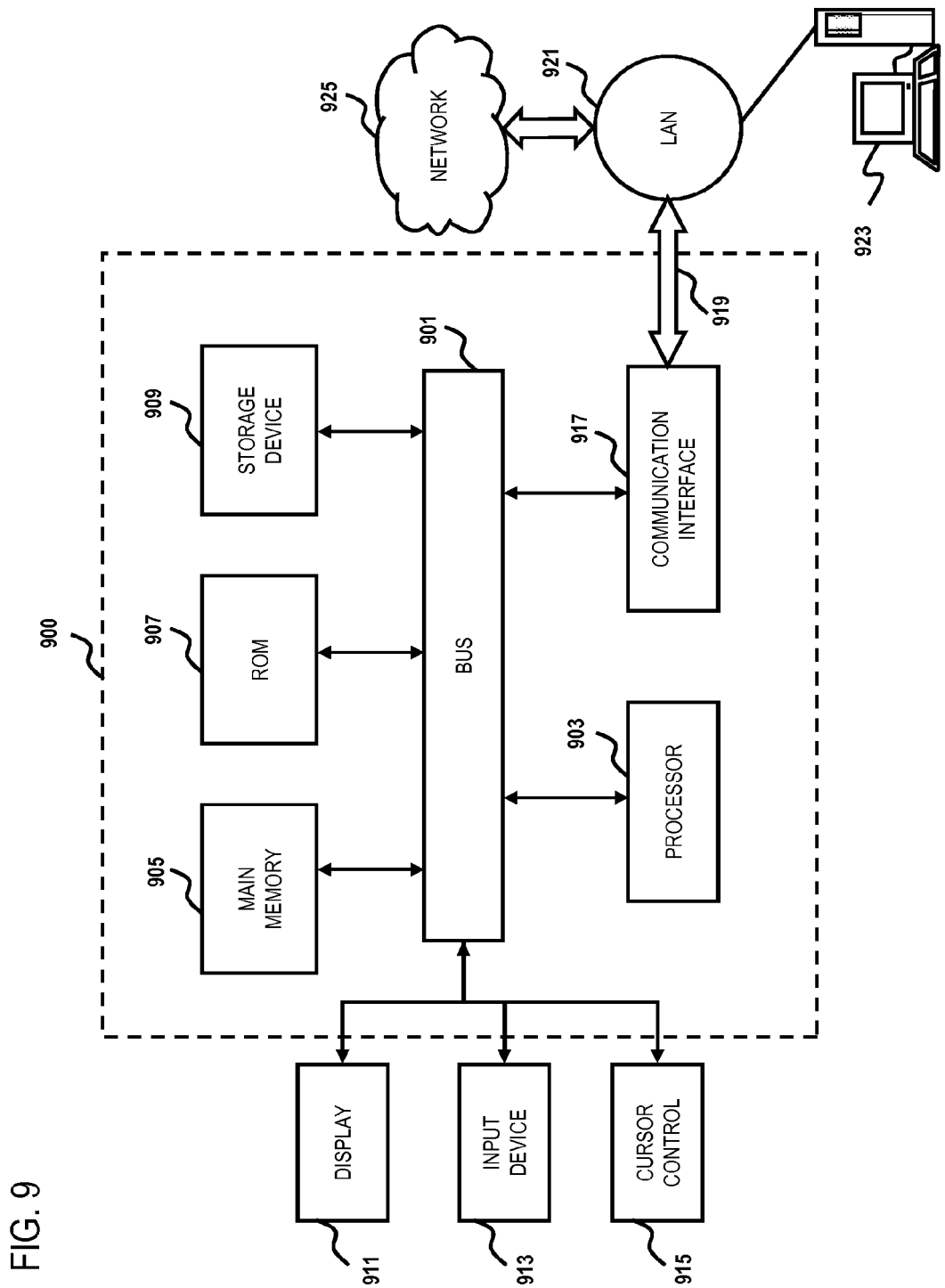
FIG. 9 is a diagram of a computer system that can be used to implement various exemplary embodiments.

FIG. 9 illustrates a computing hardware (e.g., mobile system) 900 on which exemplary embodiments may be implemented. The mobile system 900 includes a bus 901 or other communication mechanism for communicating information and a processor 903 coupled to the bus 901 for processing the information. The mobile system 900 also includes a main memory 905, such as a Random Access Memory (RAM) or other dynamic storage device, coupled to the bus 901 for storing the information and instructions to be executed by the processor 903. The main memory 905 may also be used for storing temporary variables or other intermediate information during execution of instructions by the processor 903. The mobile system 900 may further include a Read Only Memory (ROM) 907 or other static storage device coupled to the bus 901 for storing static information and instructions for the processor 903. A storage device 909, such as a magnetic disk or an optical disk, is coupled to the bus 901 for persistently storing information and instructions.

The mobile system 900 may be coupled via the bus 901 to a display 911, such as a Cathode Ray Tube (CRT), a liquid crystal display, an active matrix display, or a plasma display, for displaying information to the mobile user. An input device 913, such as a keyboard including alphanumeric and other keys, is coupled to the bus 901 for communicating information and command selections to the processor 903. Another type of a user input device may be a cursor control 915, such as a mouse, a trackball, or cursor direction keys, for communicating direction information and command selections to the processor 903 and for controlling cursor movement on the display 911.

According to an exemplary embodiment, the processes described herein are performed by the mobile system 900, in response to the processor 903 executing an arrangement of instructions contained in the main memory 905. Such instructions may be read into the main memory 905 from another computer-readable medium, such as the storage device 909. Execution of the arrangement of instructions contained in the main memory 905 causes the processor 903 to perform the process steps described herein. Processors in a multi-processing arrangement may also be employed to execute the instructions contained in the main memory 905. In alternative embodiments, hard-wired circuitry may be used in place of or in combination with software instructions to implement exemplary embodiments. Thus, exemplary embodiments are not limited to any specific combination of hardware circuitry and software.

The mobile system 900 may also include a communication interface 917 coupled to the bus 901. The communication interface 917 provides a two-way data communication coupling to a network link 919 connected to a Local Area Network (LAN) 921. For example, the communication interface 917 may be a Digital Subscriber Line (DSL) card or modem, an Integrated Services Digital Network (ISDN) card, a cable modem, a telephone modem, or any other communication interface to provide a data communication connection to a corresponding type of communication line. As another example, the communication interface 917 may be a Local Area Network (LAN) card (e.g., for Ethernet™ or an Asynchronous Transfer Mode (ATM) network) to provide a data communication connection to a compatible LAN. Wireless links may also be implemented, in one embodiment. In any such implementation, the communication interface 917 sends and receives electrical, electromagnetic, or optical signals that carry digital data streams representing various types of information. Further, the communication interface 917 may include peripheral interface devices, such as a Universal Serial Bus (USB) interface, a Personal Computer Memory Card International Association (PCMCIA) interface, etc. Although a single communication interface 917 is depicted in FIG. 9, multiple communication interfaces may also be employed.

The network link 919 typically provides data communication through networks to other data devices. For example, the network link 919 may provide a connection through the LAN 921 to a host computer 923, which has connectivity to a network 925 (e.g., a Wide Area Network (WAN) or the global packet data communication network now commonly referred to as the "Internet") or to data equipment operated by a service provider. The LAN 921 and the network 925 both use electrical, electromagnetic, or optical signals to convey information and instructions. The signals through the various networks and the signals on the network link 919 and through the communication interface 917, which communicate digital data with the mobile system 900, are exemplary forms of carrier waves bearing the information and instructions.

The mobile system 900 may send messages and receive data, including program code, through the network(s), the network link 919, and the communication interface 917. In the Internet example, a server (not shown) might transmit requested code belonging to an application program for implementing an exemplary embodiment through the network 925, the LAN 921 and the communication interface 917. The processor 903 may execute the transmitted code while being received and/or store the code in the storage device 909, or other non-volatile storage for later execution. In this manner, the mobile system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media may include, for example, optical or magnetic disks, such as the storage device 909. Volatile media may include a dynamic memory, such as the main memory 905. Transmission media may include coaxial cables, copper wire and fiber optics, including the wires that include the bus 901. Transmission media may also take the form of acoustic, optical, or electromagnetic waves, such as those generated during Radio Frequency (RF) and infrared (IR) data communications. Common forms of computer-readable media may include, for example, a floppy disk, a flexible disk, hard disk, magnetic tape, any other magnetic medium, a CD-ROM, a Compact Disc-Rewritable (CDRW), a Digital Video Disk (DVD), any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read. In certain cases, the computer readable media may include an unknown physical component wherein the information is uniquely defined by a special digital unique identifier and is available through multiple physical channels either simultaneously or exclusively.

Various forms of computer-readable media may be involved in providing instructions to a processor for execution. For example, the instructions for carrying out at least part of the exemplary embodiments may initially be borne on a magnetic disk of a remote mobile device. In such a scenario, the remote mobile device loads the instructions into the main memory and sends the instructions over a telephone line using a modem. A modem of a local computer system receives the data on the telephone line and uses an infrared transmitter to convert the data to an infrared signal and transmit the infrared signal to a portable computing device, such as a Personal Digital Assistant (PDA) or a laptop. An infrared detector on the portable computing device receives the information and instructions borne by the infrared signal and places the data on a bus. The bus conveys the data to a main memory, from which a processor retrieves and executes the instructions. The instructions received by the main memory can optionally be stored on storage device either before or after execution by processor.

Figure 10:
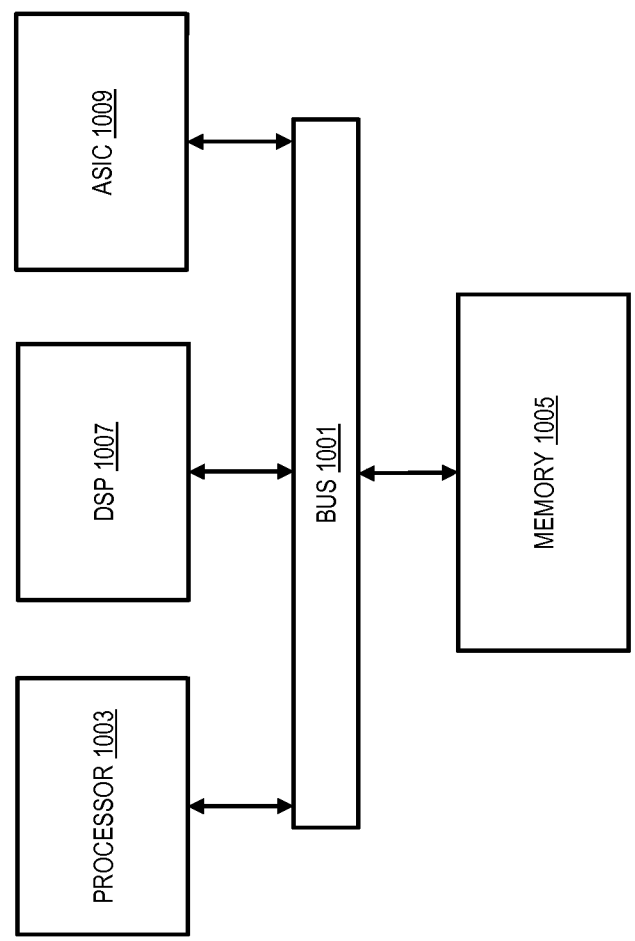
FIG. 10 is a diagram of a chip set upon which an embodiment of the invention may be implemented, according to one embodiment.

FIG. 10 illustrates a chip set 1000 upon which an embodiment of the invention may be implemented. The chip set 1000 is programmed to present a slideshow as described herein and includes, for instance, the processor and memory components described with respect to FIG. 9 incorporated in physical packages (e.g., chips). By way of example, a physical package may include an arrangement of materials, components, and/or wires on a structural assembly (e.g., a baseboard) to provide characteristics such as physical strength, conservation of size, and/or limitation of electrical interaction. It is contemplated that in certain embodiments the chip set 1000 can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include processing cores with each core to perform independently. A multi-core processor enables multiprocessing within a single physical package. Examples of a multi-core processor may include two, four, eight, or greater numbers of processing cores. Alternatively or in addition, the processor 1003 may include microprocessors configured in tandem via the bus 1001 to enable independent execution of instructions, pipelining, and multithreading. The processor 1003 may also be accompanied with specialized components to perform certain processing functions and tasks such as Digital Signal Processors (DSP) 1007, or Application-Specific Integrated Circuits (ASIC) 1009. The DSP 1007 typically processes real-world signals (e.g., sound) in real-time independently of the processor 1003. Similarly, the ASIC 1009 may perform specialized functions not easily performed by a general purposed processor. Other specialized components to aid in performing the inventive functions described herein include Field Programmable Gate Arrays (FPGA) (not shown), controllers (not shown), or other special-purpose computer chips.

The processor 1003 and accompanying components have connectivity to the memory 1005 via the bus 1001. The memory 1005 may include both a dynamic memory (e.g., RAM, magnetic disk, writable optical disk, etc.) and a static memory (e.g., ROM, CD-ROM, etc.) for storing executable instructions that when executed perform the inventive steps described herein to controlling a mobile device. The memory 1005 also stores the data associated with or generated by the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
  receiving a voice call, by a mobile device of an intended recipient of the voice call, the voice call having been placed by an originator of the voice call to the recipient;
  determining a score for the voice call based on processing a plurality of data feeds from a plurality of data sources associated with the voice call and based on values that were previously input by the recipient, the values including:
    a first value for the originator of the voice call, and
    a second value for a previous communication between the originator and the recipient;
  filtering, by the mobile device, delivery of the voice call, to the recipient, based on the score, the filtering including presenting, in an incoming communication notification portion of the mobile device of the recipient, a visual notification indicating:
    the determined score for the voice call,
    a first option to receive the voice call,
    a second option to reject the voice call, and
    a third option to update the score.

2. A method of claim 1, wherein the visual notification additionally includes:
  a fourth option to process the voice call according to a preset rule.

3. A method of claim 2, wherein the preset rule specifies criteria for the delivery of the voice call, and wherein the criteria are based on a relevancy of the voice call, a relevancy of the originator of the voice call, a popularity level of the voice call, or a popularity level of the originator of the voice call.

4. A method of claim 1, further comprising:
  receiving, from the recipient of the voice call, an input for specifying a score threshold; and
  comparing the score to the score threshold, wherein the filtering of the delivery of the voice call includes blocking delivery when the score is below the score threshold.

5. A method of claim 1, wherein the plurality of data feeds include contextual information, trust level information, nuisance caller information, organization information, or a combination thereof.

6. An apparatus comprising:
  a non-transitory computer-readable medium containing program instructions; and
  a processor to execute the program instructions to:
    receive a voice call of an intended recipient of the voice call, the voice call having been placed by an originator of the voice call to the recipient;
    determine a score for the voice call based on processing a plurality of data feeds from a plurality of data sources associated with the voice call and based on values that were previously input by the recipient, the values including:
      a first value for the originator of the voice call, and
      a second value for a previous communication between the originator and the recipient;
    filter delivery of the voice call, to the recipient, based on the score, the filtering including presenting, in an incoming communication notification portion of the apparatus, a visual notification indicating:
      the determined score for the voice call,
      a first option to receive the voice call,
      a second option to reject the voice call, and
      a third option to update the score.

7. An apparatus of claim 6, wherein the notification additionally includes:
  a fourth option to process the voice call according to a preset rule.

8. An apparatus of claim 7, wherein the preset rule specifies criteria for the delivery of the voice call, and wherein the criteria are based on a relevancy of the voice call, a relevancy of the originator of the voice call, a popularity level of the voice call, or a popularity level of the originator of the voice call.

9. An apparatus of claim 6, the processor being further configured to:
  receive, from the recipient of the voice call, an input for specifying a score threshold; and
  compare the score to the score threshold, wherein the filtering of the delivery of the voice call includes blocking the delivery when the score is below the score threshold.

10. An apparatus of claim 6, wherein the plurality of data feeds include contextual information, trust level information, nuisance caller information, organization information, or a combination thereof.

11. A system comprising a platform implemented by instructions stored in a non-transitory computer-readable medium, the instructions, when executed by one or more processors, to:
  receive a voice call of an intended recipient of the voice call, the voice call having been placed by an originator of the voice call to the recipient;
  determine a score for the voice call based on processing a plurality of data feeds from a plurality of data sources associated with the voice call and based on values that were previously input by the recipient, the values including:
    a first value for the originator of the voice call, and a second value for a previous communication between the originator and the recipient;

filter delivery of the voice call, to the recipient, based on the score, the filtering including presenting, in an incoming communication notification portion of a mobile device, a visual notification indicating:
the determined score for the voice call,
a first option to receive the voice call,
a second option to reject the voice call, and
a third option to update the score.

12. A system of claim 11, wherein the instructions, when executed by the one or more processors, are further to:
receive, from the recipient of the voice call, a score threshold; and
compare the score to the score threshold, wherein the filtering of the delivery of the voice call includes blocking the delivery when the score is below the score threshold.

13. The method of claim 1, wherein the value input by the recipient is a user score associated with the originator of the voice call.

14. The apparatus of claim 6, wherein the value input by the recipient is a user score associated with the originator of the voice call.

15. The system of claim 11, wherein the value input by the recipient is a user score associated with the originator of the voice call.

16. The method of claim 1, wherein, when the option to receive the voice call is selected by the recipient, the score associated with subsequent communications from the originator is increased.

17. The apparatus of claim 6, wherein, when the option to receive the voice call is selected by the recipient, the score associated with subsequent communications from the originator is increased.

18. The method of claim 1, further comprising:
receiving a selection from the recipient of the first option to receive the voice call; and
updating the score, to increase a value of the score, based on the selection from the recipient of the first option to receive the voice call.

19. The apparatus of claim 6, the processor being further configured to:
receive a selection from the recipient of the first option to receive the voice call; and
update the score, to increase a value of the score, based on the selection from the recipient of the first option to receive the voice call.

20. The system of claim 11, wherein the instructions, when executed by the one or more processors, are further to:
receive a selection from the recipient of the first option to receive the voice call; and
update the score, to increase a value of the score, based on the selection from the recipient of the first option to receive the voice call.

* * * * *